Oct. 7, 1930.  P. GOTTSCHALK  1,777,361
MEANS FOR TURNING CIGARETTES
Filed July 5, 1929  6 Sheets-Sheet 1

Inventor
Paul Gottschalk
by Emil Bonnel
attorney

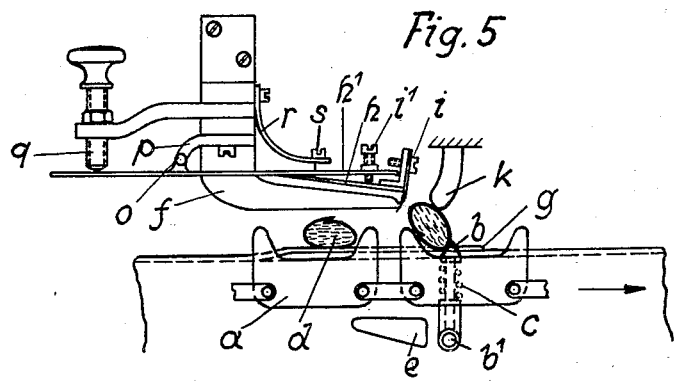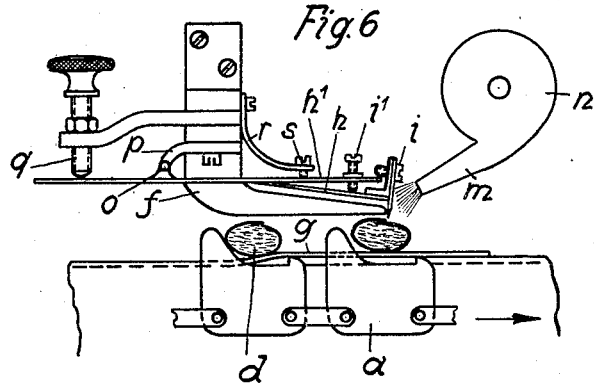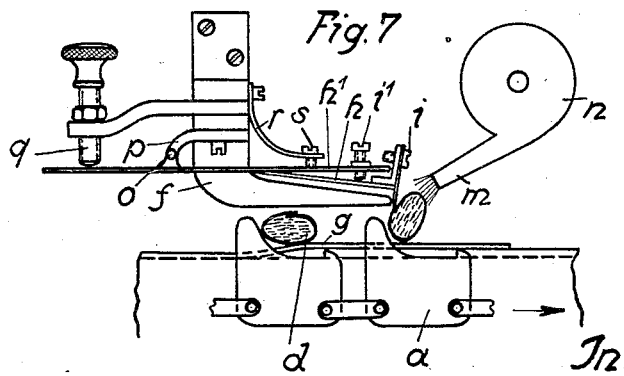

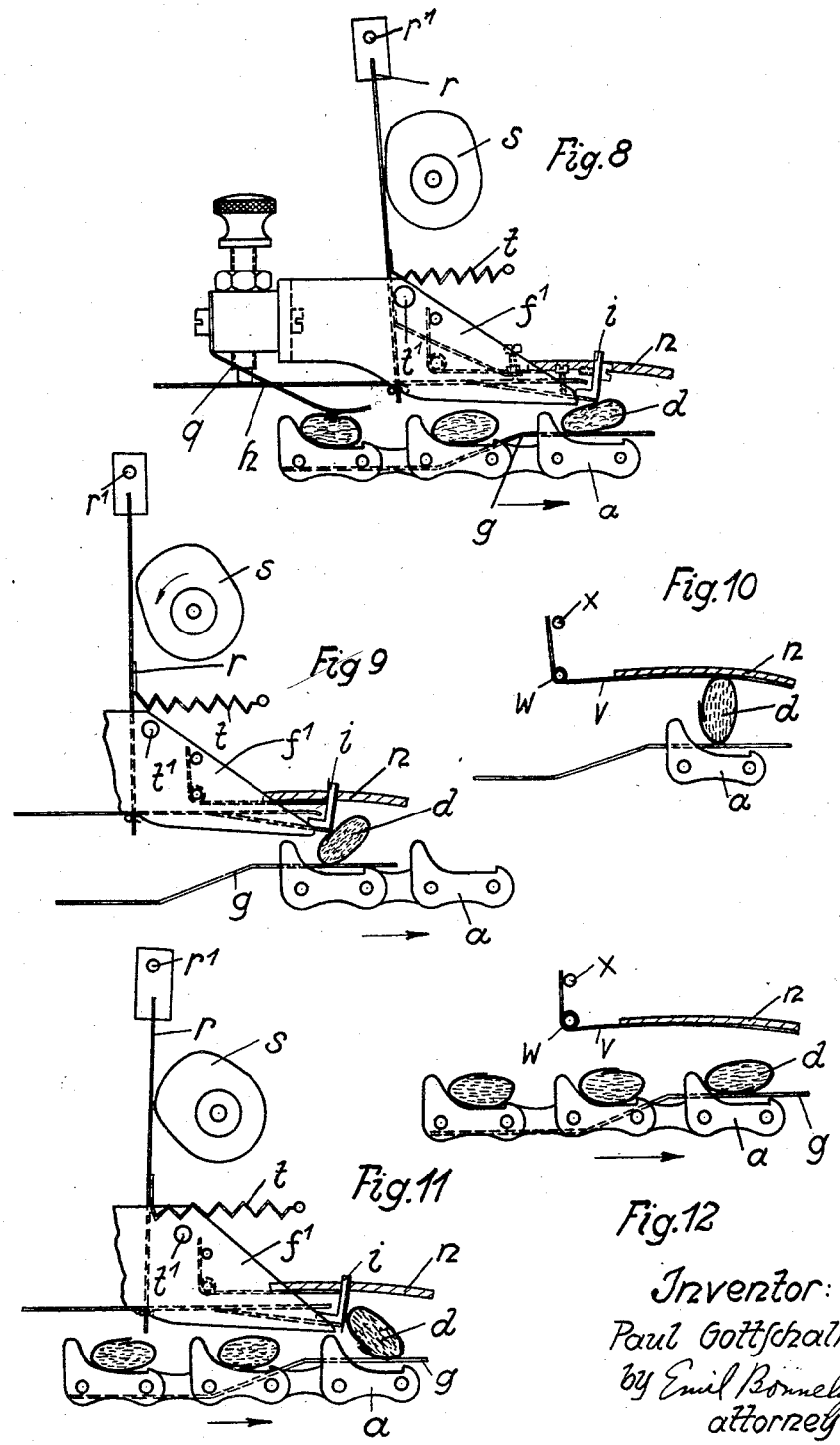

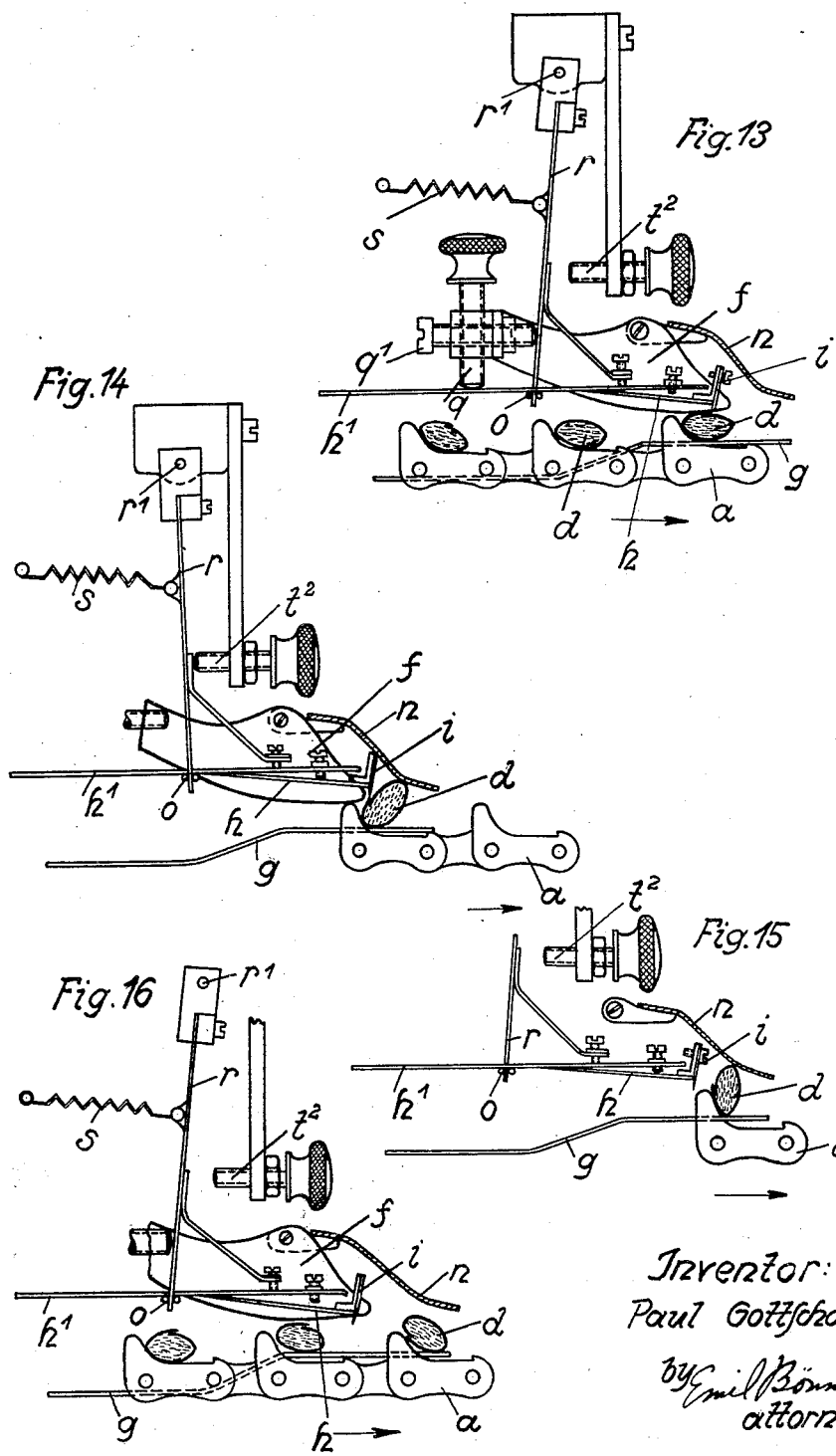

Oct. 7, 1930.  P. GOTTSCHALK  1,777,361
MEANS FOR TURNING CIGARETTES
Filed July 5, 1929   6 Sheets-Sheet 5

Inventor:
Paul Gottschalk
by Emil Bonnelycke
attorney

Oct. 7, 1930.  P. GOTTSCHALK  1,777,361
MEANS FOR TURNING CIGARETTES
Filed July 5, 1929  6 Sheets-Sheet 6

Inventor:
Paul Gottschalk
by Emil Bonnelycke
attorney

Patented Oct. 7, 1930

1,777,361

UNITED STATES PATENT OFFICE

PAUL GOTTSCHALK, OF DRESDEN, GERMANY, ASSIGNOR TO UNITED CIGARETTE MACHINE COMPANY AKTIENGESELLSCHAFT, OF DRESDEN, GERMANY

MEANS FOR TURNING CIGARETTES

Application filed July 5, 1929, Serial No. 376,067, and in Germany December 21, 1928.

When feeding cigarettes to a packing machine, it is desired that the top-most layer be arranged in such a way that the printed lettering upon the cigarettes is directed upwards. Various attempts have already been made to adjust the cigarettes mechanically by causing a finger, catch or the like to engage the outer edge of the seam. Such attempts, however, failed because the effort exerted by the moving cigarettes on the finger or the catch is so small that the cigarettes cannot be completely turned by the said finger. For this reason it has been proposed to use the finger merely as an auxiliary, in other words, to achieve the desired result by means of a mechanical, electrical or other devices, the operation of which then turns the cigarette. These devices, however, unfortunately have the drawback that the incorporation of such auxiliary finger and the arrangement of the mechanical turning device greatly complicate the machine and render its operation unreliable.

According to the present invention the finger or catch is arranged to engage the seam for directly turning the cigarette. The difficulty in this achievement i. e. that the finger will lose contact with the edge of the seam shortly after the cigarette has begun to turn is, according to the invention, done away with by using the finger merely for the purpose of giving a short initial turn to the cigarette and, thereby, bringing it into such a position that further mechanical, electrical, pneumatic or any other turning device may act upon it in order to bring it finally into the correct position. The second additional device intended for effecting the complete turning of the cigarette can be so designed as to be constantly ready for use, so that it can act on the cigarette brought within its range. It can, however, also be so designed that it is only put into operation through the finger coming into action. Instead of a mechanical catch-like finger, an air blast can also be used, which is directed against the edge of the seam, thereby raising the cigarette.

Drawings are appended illustrating examples of various forms of the invention in which:

Fig. 5 shows the cigarette completely turned.

Fig. 6 shows a second form of the invention at the moment when the finger engages the cigarette in which, instead of a fixed stop, a blast of air is used.

Fig. 7 shows the second form of the invention at the moment when the air blast acts on the cigarette.

Fig. 8 is a diagrammatic view showing a further form of the invention seen from the side at the moment when the finger engages the cigarette.

Fig. 9 is a similar view to Fig. 8 and shows the device at the moment when the finger has half raised the cigarette.

Fig. 10 shows the cigarette fully raised and engaging with an auxiliary device which helps to turn the cigarette.

Fig. 11 shows the position of the parts after the cigarette has been tilted over and Fig. 12 shows the cigarette completely turned.

Fig. 13 shows a still further form of the invention at the moment when the finger engages with the cigarette.

Fig. 14 shows the device at the moment when the finger begins its forward movement.

Fig. 15 shows the completion of the turning of the cigarette by means of an additional turning device.

Fig. 16 shows the device after the cigarette has been completely turned.

In the form of the invention shown in Figs. 1–5, a indicates the links of the conveying chain, on which the cigarettes are fed to the packing machine. The links in this case are comparatively wide and have for instance in the centre a pin b pressed by a spring c into the position shown in Fig. 1, so that the head projects beyond the surface of the chain link. The head is bevelled on either side or rounded, and consequently forms, with the raised edge of the chain link, a resting place for the cigarette d. The pins b carry at their lower ends a roller $b^1$ which at the right moment, when the chain moves forward, can engage with a cam or a wedge fixed to the frame of the machine. The wedge then forces the roller downwards and thereby draws the pin b into the chain link.

Disposed above the chain is a cover or guiding bracket f, and below this cover bracket there is placed a spring g, so that directly the cigarettes carried forward on the chain arrive at the spring they are pressed by the latter slightly upwards against the cover bracket f, with the result that the finger is able to engage properly. The finger itself can be made in any of the usual ways. In the form represented it consists of two springs h and $h^1$ connected together at one end. Their free ends, owing to the stops i and $i^1$ cooperate in such a way that at first only the lower and weaker spring h acts when the point of the finger lies on the cigarette and slides onto the seam, but immediately the finger touches the seam the second spring $h^1$ which is stronger also operates and the finger and cigarette engage more firmly. The springs h, $h^1$ are pivoted at o on an arm p which is fixed to the frame of the machine; said spring projecting beyond the point of suspension and there engages an adjustable stop q which is also fixed on the frame of the machine, this stop determining the lowermost position of the spring when at rest. A spring r is also provided, fixed on one side to the frame of the machine, and presses preferably through the agency of an adjustable stop s, against the spring $h^1$; which is thus held in contact with the stop q.

In the conveying device, behind the finger is a fixed stop k the lower end of which is at such a distance from the path of the cigarette that those cigarettes which lie flat can pass under the stop without touching it, whilst those cigarettes which are slightly raised push against it.

Figure 3:
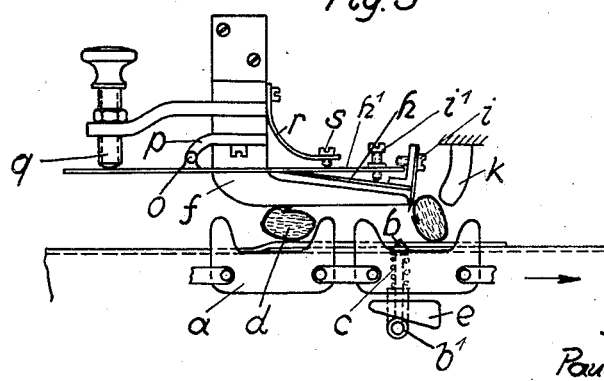
Fig. 3 shows the operation of the stop.
Figure 17:
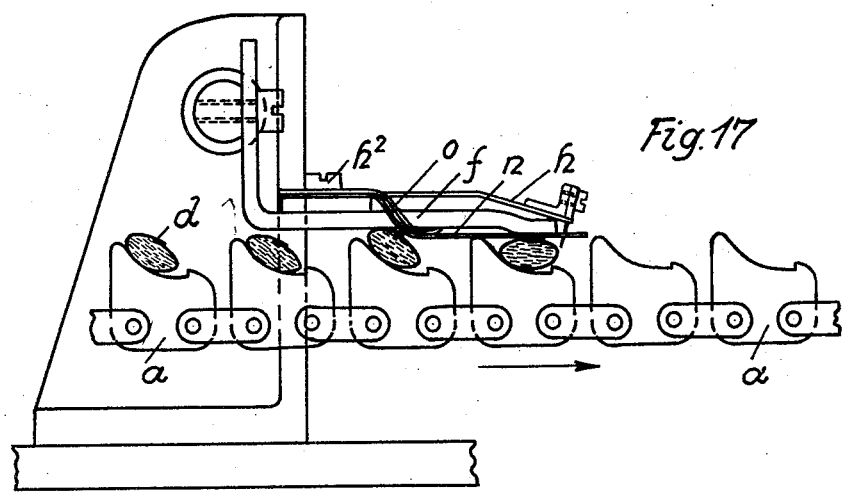
Fig. 17 is a diagrammatic side view of a further modification.
Figure 18:
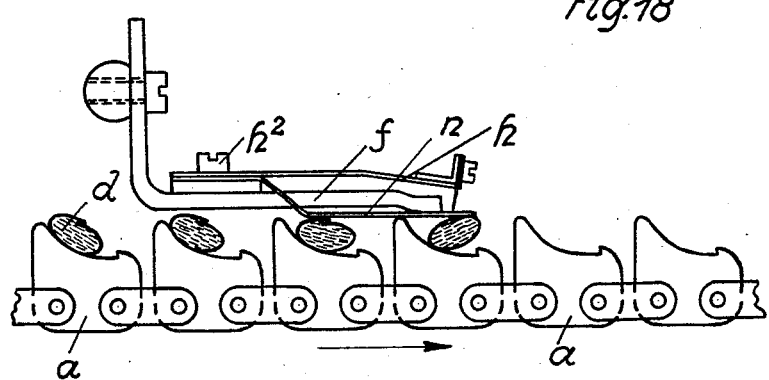
Figs. 18–21 are similar views, showing the mode of operation of the devices and representing various phases of the turning movement of the cigarette.
Figure 19:
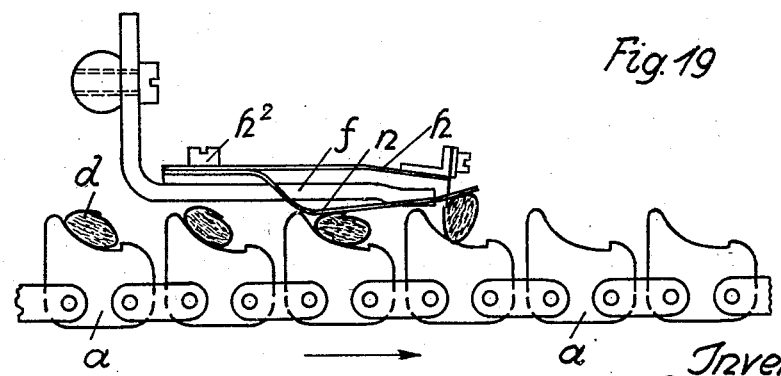
Figure 20:
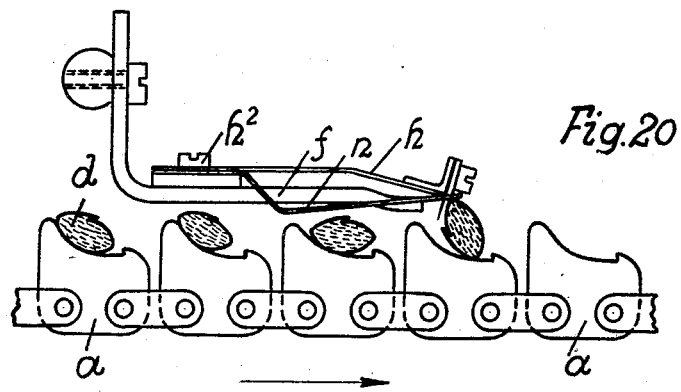

The method of operation is as follows: If a cigarette lies wrongly turned on its chain link a the finger h $h^1$ will engage the seam in the usual way. The finger in the cigarette conveying device is connected firmly to the frame of the machine. Consequently, when the conveying device moves on, the cigarette must be raised and to turn round at the bracket f. Prior to this the bracket f together with the spring g have ensured that the finger and the cigarette seam shall engage properly. The cigarette is therefore turned into the position shown in Fig. 2, the head of the pin b acting as a counterstop. After this the cigarette comes into contact with the stop k. This stop, after the hold on the cigarette has ceased by the catch sliding off, acts on the former and turns it further as shown in Fig. 3 until the unstable position of equilibrium is overstepped and the cigarette is able to roll over.

As the guide passes under the stop k the cigarette might stick or jam between the head of the pin b and the stop k but for the fact that the pin b is drawn down against the action of its spring by the wedge e acting on the roller $b^1$.

Figure 1:
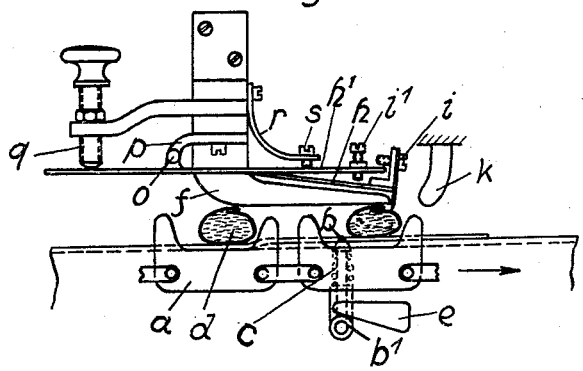
Fig. 1 is a diagrammatic view of the one form of the invention shown at the moment when the finger commences to engage the edge of the seam of the cigarette.
Figure 2:
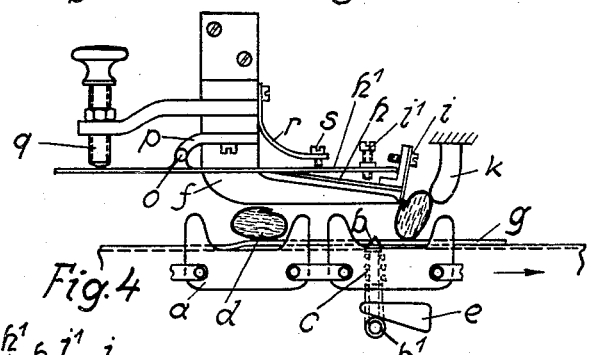
Fig. 2 is a similar view at the moment when the finger has raised the cigarette, just before it comes into contact with a second stop.
Figure 4:
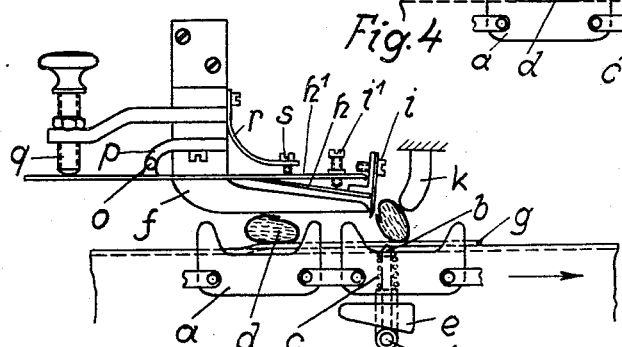
Fig. 4 shows the moment when the cigarette tilts over.

Fig. 4 shows the position of the cigarette while being turned and when the pin b has been drawn down. Finally in Fig. 5 is shown the position after the cigarette has been turned completely. The pin b is released and can return to its original position, where the other side of its head now serves as a counter stop for the overturned cigarette.

The form of the invention according to Figs. 6 and 7 differs only from that just described by the fact that instead of the stop k a nozzle m is provided, from which issues compressed air produced for example by means of a blower connected to a nozzle. So far as the finger is concerned the device works in the same way as previously described. Immediately the cigarette has been raised by the finger, as shown in Fig. 7, and the chain moved further on, the compressed air issuing from the nozzle acting in conjunction with the opposing motion of the chain carrying the cigarette causes the latter to turn over.

A cigarette lying correctly will not be raised by the finger and consequently it can pass both under the stop k and under the blast of air from the nozzle without any action being exerted upon it.

In the form of the invention represented in Figs. 8–12 the turning device is considerably simplified in so far that the finger itself has imparted to it a periodical to and fro motion, in the direction of the line of travel of the cigarette, with the result that owing to a brisker relative movement of the finger and the cigarette conveying device, the cigarette is turned beyond the unstable position of equilibrium, and under the action of its own weight or with the aid of a check-piece device, can be turned into the position required for the final top-layer.

In this case also a are the links of the chain which transfers the cigarettes from the cigarette machine to the packing machine, on which links lie the cigarettes $d$. At the place where the incorrectly arranged cigarettes are to be turned where necessary a guide $f^1$ is fixed to the frame of the machine and against this bracket the arriving cigarettes are held slightly pressed by a leaf spring $g$ working from underneath. This results in the cigarettes being secured into position so that the finger can engage them easily.

The finger in this case is in the form of a lever $r$ pivotable round a fixed point $r^1$, this lever being oscillated to and fro by a non-circular cam $s$ revolving continuously and working in conjunction with the spring $t$. The spring draws the finger against the cam $s$ or against a stop $t^1$. The oscillating lever $r$ carries the finger lever proper $h$ which is pivoted at its lower end in the usual way. On one side at its free end, this lever lies against an adjustable stop $q$ whilst the other end carries the finger part $i$ which engages the cigarette. Besides the finger lever, a check-device $n$ is also provided on the frame of the machine, and as can be clearly seen in Figs. 10 and 12, is fixed to a spring $v$. The spring is pivotable round a pivot $w$ and its free end lies against a stop $x$. The method of operation of the system is therefore as follows:

The oncoming cigarette passes between the bracket $f^1$ and spring $g$ and if its seam is uppermost the finger $i$ of the finger lever $h$ engages with the seam. Owing to the cigarette carrying chain $a$ moving further in the direction of the arrow and to the ensuing motion of the finger lever $r$ in the opposite direction, the cigarette is turned as shown in Fig. 9. Finally it assumes the position shown in Fig. 10 in which position it rests against the check-piece $n$. This check-piece prevents the cigarette from rolling back. On the further advance of the chain $a$ the cigarette will assume the position shown in Fig. 11, and finally turn right over.

Fig. 12 shows the completely turned cigarettes passing under the check-device.

Instead of the non-circular cam $s$ and the spring $t$, other means can be used for effecting the to and fro oscillation of the finger, for example, crank gear or a double-acting cam disc and the like.

Preferably the finger will be caused to move to and fro continuously, as in the example given, although the arrangement could be such that the movement of the finger in the direction opposed to that in which the cigarettes are fed be determined only by the engagement of the finger with the seam, the finger in the first part of its movement operating a relay, electrically or mechanically, which relay sets in motion the mechanism controlling it. Greater simplicity and reliability are afforded by the system of continuous movement represented in the drawing. The check $n$, which in the form shown works by its own weight, can also be operated by means of springs; in certain cases also it can be omitted altogether.

The further form of the invention represented in Figs. 13–16 is designed to secure an especially good contact between the finger and the cigarette.

In the form previously described, a fixed bracket or a fixed stop was provided, against which the cigarettes were held by springs, so as to allow of their being seized by the finger. This bracket has the disadvantage that the cigarette can only be turned when it has passed the fixed stop area. On the other hand a stop is no longer necessary as soon as the finger actually engages the seam. In accordance with the form of the invention illustrated in Figs. 13–16 the finger, in order to facilitate the turning of the cigarette, at first, travels with the cigarette without turning it, until the cigarette is beyond the range of its holding bracket, whereupon the cigarette is turned by the finger, which is then stationary.

As in the form just described, in this case also, the cigarettes $d$ are first brought under the fixed stop area $f$ by the conveying chains $a$ and are held against the surface by the spring $g$ working from underneath. Also the finger consists of a spring $h$, $h^1$ which is suspended from a lever $r$ and rotatable round a pivot $o$, the lever being itself pivoted at $r^1$ on the frame of the machine. The lever $r$ is held in contact with a stop $q^1$ by a spring $s$, while the spring $h^1$ when at rest lies against a stop $q$. Fixed to the frame of the machine there is also a stop $t^2$ and an auxiliary turning device or check $n$ is arranged pivotably on the fixed guide $f$. The method of operation is therefore as follows:

The incorrectly fed cigarette $d$ as can be seen in Fig. 13 comes into contact with point $i$ of the finger when the latter is in the position shown. At this instant it is held by the spring $g$ against the stop $f$, and on the chain $a$ moving further in the direction of the arrow, the finger is also carried along until it arrives in the position shown in Fig. 14 where it comes in contact with the stop $t^2$. The cigarette, which by this time is beyond the range of the part $f$, is now turned by the finger as shown in Fig. 14, whereby it engages with the check-piece or auxiliary turning device $n$. When the chain advances further, the finger leaves the seam of the cigarette and the final turning takes place under the action of the said check-device or auxiliary turning device $n$.

Fig. 16 shows the position after the final turning of the cigarette has been completed and the finger has returned to its original position under the action of the spring $s$.

The movement of the finger with the cigarette, apart from the advantage of the cigarette being released by the bracket as already mentioned, has the further advantage that owing to the finger engaging the cigarette for a longer time before the turning action commences, the grip is firmer and the cigarette is therefore turned more reliably.

Finally, in the form of the invention represented in Figs. 17–22, the second turning device in accordance with the forms shown in Figs. 1–5 is considerably simplified.

As in the form first represented, the cigarettes $d$ are in this case brought under the guide $f$ by the link $a$ of the conveying chain, the bracket preventing any unneeded turning of the cigarettes or else turning them as they pass beneath in such a manner that they lie flat, whereby the seam lies either upwards or downwards.

Figure 21:
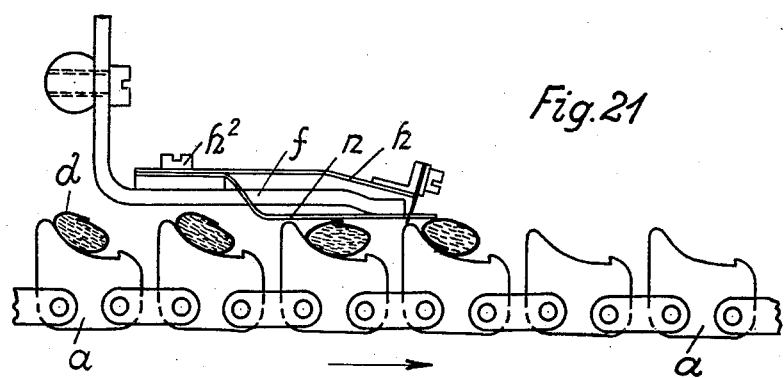

The guides $f$ are so designed that at the same time they limit the downward movement of the finger $h$ as shown in Fig. 21.

Figure 22:
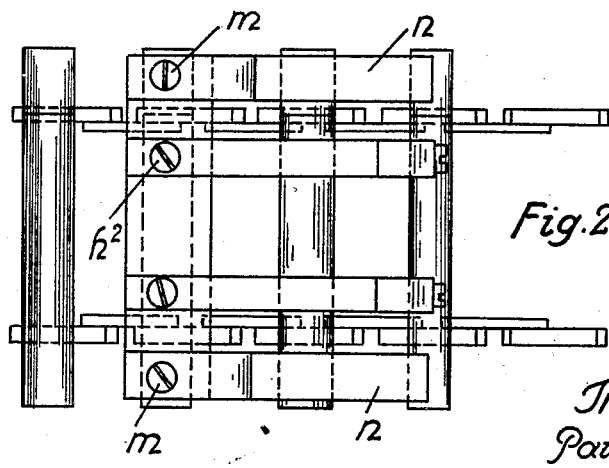
Fig. 22 is a plan view of the parts shown in Figs. 18 to 21.

On the plan view in Fig. 22, the guiding brackets $f$ as well as the portion of the frame, have been omitted for greater clearness.

Of course instead of the two springs $n$ one or more than two springs can be provided, and suitably arranged lengthwise over the cigarette; in the same manner the number of fingers $h$ is optional, likewise the particular design of the finger.

In the example of the invention represented, the spring $n$ not only serves to turn the cigarette completely, but also to lay it flat before it reaches the finger. For both these purposes however, one may also adopt various devices i. e. one or several springs which lie against the arriving cigarettes and lay them flat, and one or several additional springs which only engage them in the manner described, after the flat-laid cigarettes have been partially turned by the finger.

Naturally the continuously operating system for the complete turning of the cigarettes in the examples according to Figs. 1–7 can also be arranged so that they are brought into the working position by the finger only, for example in such a manner that the nozzle $m$ is only opened by the slight additional raising of the finger when it turns the cigarette. Preferably however the simpler design as shown in the examples according to Figs. 1–7 will be adopted.

To assist in turning the cigarette, if desired further auxiliary means may be provided, for example a slight air blast may be continuously directed against the lower side of the cigarette facing the direction of feed. This blast, by reducing the friction of the cigarette in relation to its support, could assist the action of the air blast issuing from the nozzle $m$, or the action of the stop $k$ or the like. In the forms in accordance with Figs. 1–7 the finger and the stop $k$ or the nozzle $m$ are fixed to the frame of the machine, and the cigarette moves relatively to them on the feed band. Conversely, however, the feed band can remain stationary and the reversing device be moved in relation to this band, or finally both parts can also be in motion. The essential point merely is that relative movement between the cigarette and the finger or the stop takes place during the engagement of the catch or the stop.

I claim:—

1. Apparatus for turning cigarettes and similar rod-shaped articles, comprising in combination a finger adapted to engage the seam of the cigarette, means for moving the said finger in relation to the cigarette in such a manner that the cigarette is turned, and a device for the complete turning of the cigarette within the range of which the cigarette arrives after it has been partly turned by the finger.

2. Apparatus for turning cigarettes and similar rod-shaped articles, comprising in combination a finger adapted to engage the seam of the cigarette, means for moving the said finger in relation to the cigarette in such a manner that the cigarette is turned, and a stop so placed above the feed path of the cigarettes that flat-laid cigarettes can pass beneath it, while cigarettes partly turned by the said finger are engaged by the stop and turned into the flat position.

3. Apparatus according to claim 2 in which the side of the cigarette facing the stop in the cigarette feed device is supported by a second stop, which is withdrawn from the path of the cigarette immediately the latter is brought beyond the unstable position of equilibrium by the first-mentioned stop which turns it.

In testimony whereof I affix my signature.

PAUL GOTTSCHALK.